United States Patent

Phoenix et al.

[15] 3,662,118

[45] May 9, 1972

[54] CIRCUITRY MEANS TO ENABLE THE AUTOMATIC DIALLING OF TELEPHONE NUMBERS WITHOUT LIFTING THE HANDSET

[72] Inventors: Lancelot Phoenix, Birmingham; Joseph David Foulkes Taylor, Eardiston, near Tenbury Wells, both of England

[73] Assignee: Joseph Lucas (Industries) Limited, Birmingham, England

[22] Filed: Apr. 8, 1970

[21] Appl. No.: 26,735

[30] Foreign Application Priority Data

May 15, 1969 Great Britain ....................24,746/69

[52] U.S. Cl. ....................................179/90 B, 179/81 B

[51] Int. Cl. ....................................H04m 1/26

[58] Field of Search ............179/90 BD, 2 DP, 90 B, 90 AD, 179/5, 90 R, 2.5, 1 C, 2 C, 2 A, 81 B

[56] References Cited

UNITED STATES PATENTS 3,466,395 9/1969 Prins ....................................179/2 DP 3,390,234 6/1968 Glidden ....................................179/5

*Primary Examiner*—Kathleen H. Claffy

*Assistant Examiner*—Tom D'Amico

*Attorney*—Holman, Glascock, Downing & Seebold

[57] ABSTRACT

Automatic Telephone Dialling Apparatus of the kind having a handset and switch means operable manually to dial automatically a pre-selected telephone address. The Apparatus includes a pair of DC supply lines and a rectifier coupling the DC supply lines to the telephone lines to provide power to the DC supply lines. A trigger circuit is connected between the DC supply lines and controls the supply of power thereto. An amplifier and an associated loudspeaker are connected between the DC supply lines and are coupled to the telephone lines, so that when the trigger circuit is operative the loudspeaker will produce an audible amplified version of the signals on the telephone lines. There is provided means operable when the switch means is operated to dial a selected telephone address for driving the trigger circuit to its operative state, and inserting across the telephone lines an impedance which simulates lifting of the handset. Further means is provided for driving the circuit to its inoperative state when the handset is lifted the trigger circuit incorporating a battery for maintaining the trigger circuit in its operative state during dialling.

3 Claims, 2 Drawing Figures

INVENTOR
Lancelot Phoenix & Joseph Davis Foulkes Taylor
Holman, Glascock, Downing & Seebold
ATTORNEYS INVENTOR
Lancelot Phoenix & Joseph Davis Foulkes Taylor Holman, Glascock, Downing & Seebold
ATTORNEYS

CIRCUITRY MEANS TO ENABLE THE AUTOMATIC DIALLING OF TELEPHONE NUMBERS WITHOUT LIFTING THE HANDSET

This invention relates to automatic telephone dialling apparatus of the kind including a handset, and switch means operable manually to dial automatically a pre-selected telephone address.

The usual arrangement in such apparatus is to have a number of manually operable switches, usually press buttons, each of which when depressed will dial a previously selected telephone address. In order to use the apparatus, the handset is lifted from its rest in the usual way, and the appropriate button is depressed. In other words, the apparatus is used in exactly the same way as a normal telephone, except that no dialling is necessary. Since one of the primary advantages of automatic telephone dialling apparatus is intended to be time-saving, it will be appreciated that the usual arrangement is somewhat unsatisfactory in this respect. The object of the invention is to provide automatic telephone dialling apparatus in which this disadvantage is minimised by enabling a telephone address to be obtained by operating the appropriate manually operable switch, without the necessity of lifting the handset until the address is obtained.

Apparatus of the kind specified according to the invention, includes a pair of DC supply lines, a rectifier coupling the DC supply lines to the telephone lines to provide power to said DC supply lines, a trigger circuit connected between the DC supply lines and controlling the supply of power thereto, an amplifier and associated loudspeaker connected between the DC supply lines and coupled to the telephone lines, so that when the trigger circuit is operative the loudspeaker will produce an audible amplified version of the signals on the telephone lines, means operable when the switch means is operated to dial a selected telephone address for driving the trigger circuit to its operative state, and inserting across the telephone lines an impedance which simulates lifting of the handset, the amplifier and loudspeaker then operating so that the dialling tone can be heard without lifting the handset, and means for driving the circuit to its inoperative state when the handset is lifted, the trigger circuit incorporating a battery for maintaining the trigger circuit in its operative state during dialling.

Figure 1:
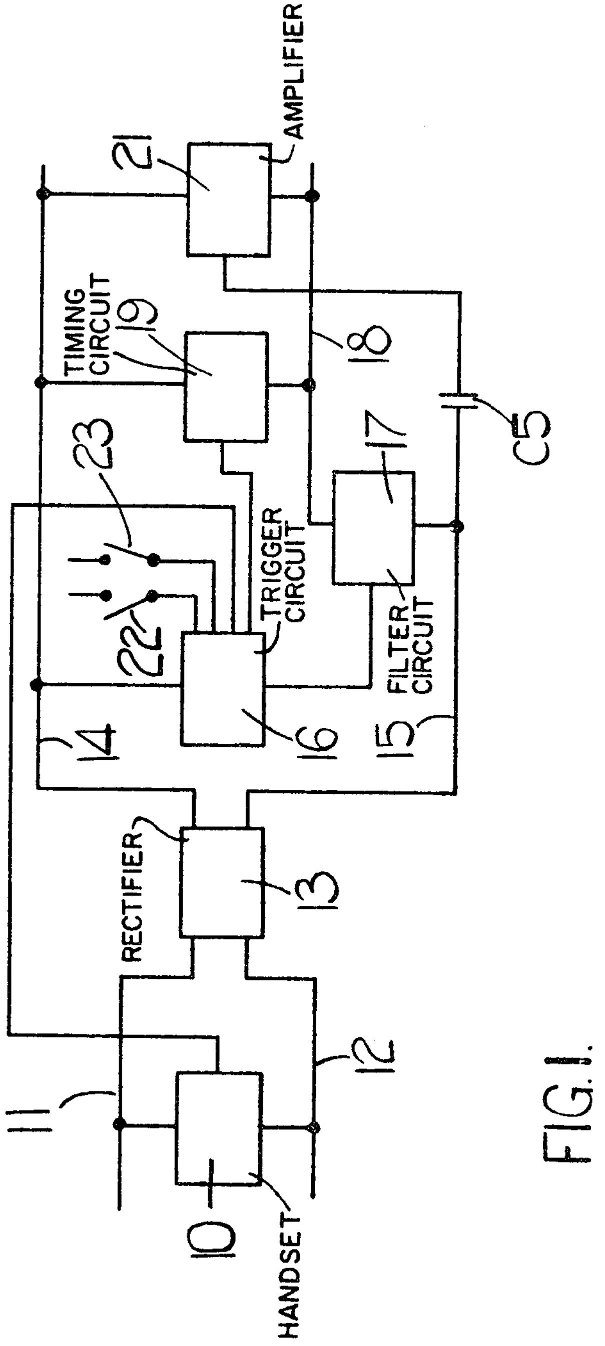
Figure 2:
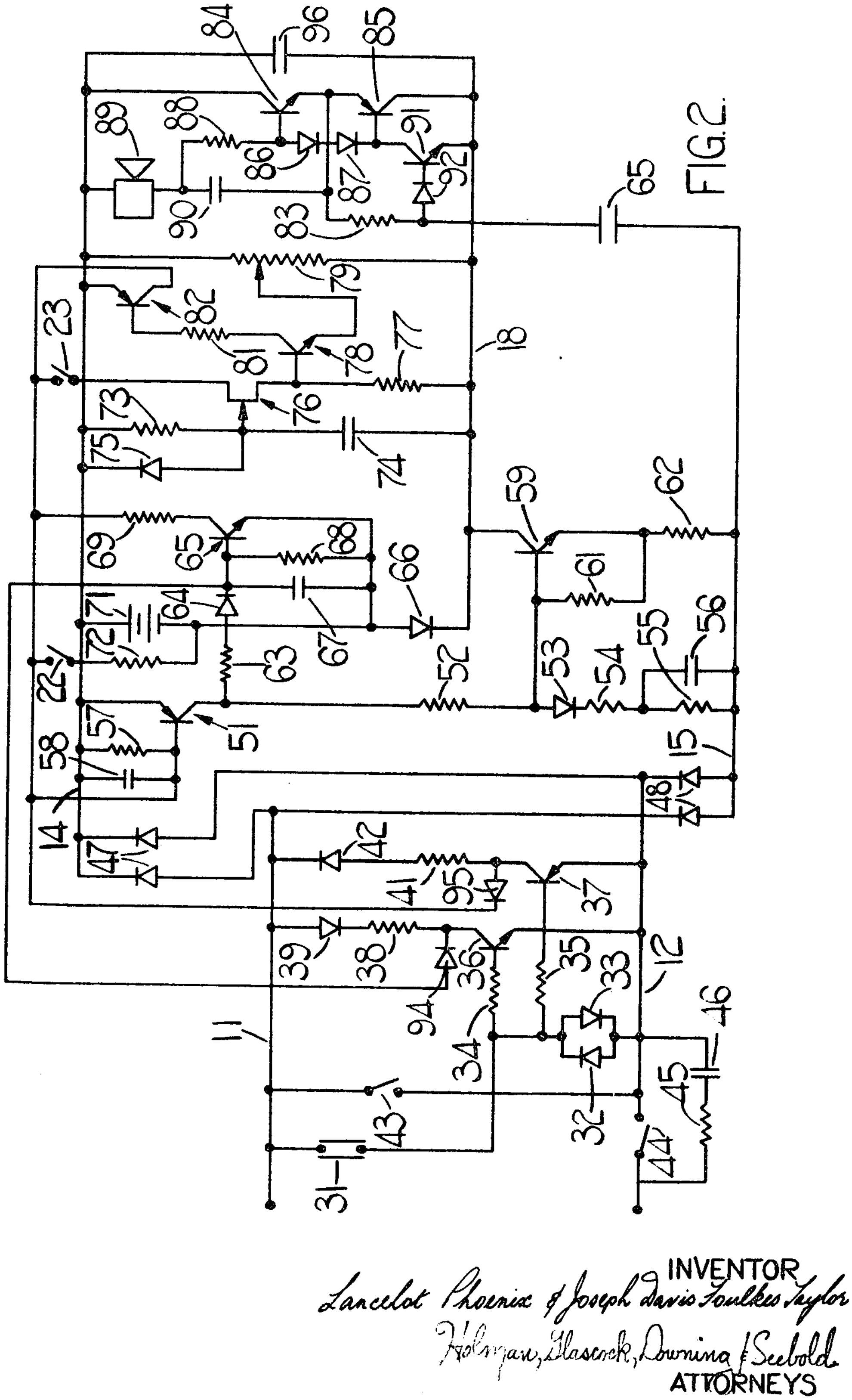

An example of the invention is illustrated in the accompanying drawings, in which FIG. 1 is a block diagram and FIG. 2 is a full circuit diagram corresponding to FIG. 1.

Referring first to FIG. 1, the G.P.O. telephone lines are indicated at 11 and 12, and between them is connected a handset sensor 10 of any convenient known form which produces an output when the handset is lifted from its rest. The output from the lines 11, 12 is fed through a full wave rectifier 13 to a pair of supply lines 14 and 15 between which is connected a trigger circuit 16. The trigger circuit when operative produces an input which is fed to a filter circuit 17 providing power to a supply line 18, between which are connected in parallel a timing circuit 19 and an amplifier 21 with an associated loudspeaker. The amplifier 21 receives a signal from the G.P.O. lines by way of a capacitor C5.

On both national and private telephone systems, it is arranged that when the telephone handset is on its rest the lines 11 and 12 are open circuit and the line voltage is at a first DC level. Lifting the handset connects the telephone across the lines so that current flows into the telephone and the line voltage falls to a lower value. The call tones and conversation are AC signals superimposed on this lower value signal, but to cause ringing of the telephone receiver bell an additional AC voltage is generated on the lines so that equipment connected to the telephone lines must be able to withstand high voltage peaks. When a dialling operation commences, the lines 11 and 12 are first completely short-circuited as the dial is moved from rest. The line is then open-circuited a number of times corresponding to the digits dialled, and when the dial returns to its rest position the short-circuit is removed. This of course is taken into account in designing the various circuits.

In the arrangement shown, the trigger circuit 16 is normally non-operative, but when a telephone address is to be dialled, the appropriate button is depressed. The sensor 10 is modified in any convenient manner so that depression of any one of the buttons closes a switch 22 which drives the trigger circuit 16 to its operative state and brings into operation a filter 17 which also acts as a switch so that there is supplied to the lines 14, 18 a DC signal derived entirely from the G.P.O. lines 11, 12. The rectifier 13 is necessary because the lines 11 and 12 can reverse in polarity, and the filter 17 acts in a manner to be described to insert across the lines 11, 12 an impedance simulating lifting of the handset.

As soon as the voltage appears between the lines 14 and 18, the amplifier 21 operates, and the signal received through the capacitor C5 causes the loudspeaker in the amplifier 21 to operate to produce an audible signal which is an amplification of the signals on the G.P.O. lines 11 and 12. Thus, when the button is pressed, the operator of the telephone will hear the address being dialled, so that he knows that the apparatus is working correctly. When the address is obtained, then as soon as the telephone is answered, the handset can be lifted from its rest, at which point the sensor 13 provides an input to the trigger circuit 16 to render it inoperative. If the number is not obtainable, the timing circuit 19 provides an alternative input to the circuit 16 to render it inoperative after a predetermined length of time. The circuit 16 can also be rendered inoperative before the end of this period by a switch 23 which also turns off the dialling equipment.

It has previously been mentioned that during dialling the lines 11 and 12 are short-circuited and then open-circuited. It is of course necessary to maintain power to the trigger circuit during this operation, and for this purpose the trigger circuit includes a battery providing the required power at this time, the battery being itself charged by the lines 14, 18.

Referring now to FIG. 2, the G.P.O. lines are again indicated at 11 and 12, and the handset sensor is connected between them, and includes a switch 31 which is closed only when the handset is lifted and is connected at one end to the line 11 and at the other end to the line 12 through a pair of oppositely connected diodes 32 and 33 in parallel. The junction of the switch 31 and the diodes 32, 33 is connected through resistors 34 and 35 respectively to the bases of a pair of transistors 36 and 37 having their emitters connected to the line 12. The collector of the transistor 36 is connected through a resistor 38 and a diode 39 in series to the line 11, whilst the collector of the transistor 37 is connected through a resistor 41 and a diode 42 in series to the line 11. The output from this part of the circuit is obtained in a manner to be described. The switch 43 shown connected between the lines 11 and 12, and the switch 44 shown in the line 12 are shown to represent the short-circuiting and open-circuiting of the lines during dialling, and connected across the switch 12 in series are a resistor 45 and a capacitor 46.

The lines 11 and 12 provide an input to a full wave rectifier, the diodes of which are in pairs 47 and 48 providing power to the lines 14 and 15. Connected between the lines 14, 15 is a series circuit including the emitter-collector of a PNP transistor 51, a resistor 52, a diode 53, a resistor 54 and a resistor 55 which is bridged by a capacitor 56. The base of the transistor 51 is connected to the line 14 through a resistor 57 and a capacitor 58 in parallel, and the junction of the resistor 52 and diode 53 is connected to the base of an NPN transistor 59 having its emitter and base interconnected through a resistor 61, its emitter connected through a resistor 62 to the line 15 and its collector connected to the line 18. The collector of transistor 51 is further connected through a resistor 63 and a diode 64 in series to the base of an NPN transistor 65 the emitter of which is connected to the anode of a diode 66 having its cathode connected to the line 18. The base of the transistor 65 is also connected to the anode of the diode 66 through a capacitor 67 and a resistor 68 in parallel, and its collector is connected to a resistor 69 to the base of the transistor 51. A battery 71 is connected between the lines 14, 18 in series with a diode 66, with the positive terminal of the battery connected to the line 14. The negative terminal of the battery is connected through a resistor 72 and the switch 22 to the base of the transistor 51. The switch 23 is connected between the base of the transistor 51 and the line 14.

The timing circuit includes a resistor 73 and capacitor 74 connected in series between the lines 14, 18, the resistor 73 being bridged by a diode 75. The junction of the resistor 73 and capacitor 74 is connected to the gate of a field effect transistor 76, the drain of which is connected to the line 14 and the source of which is connected through a resistor 77 to the line 18 and is further connected to the base of an NPN transistor 78 having its emitter connected to a variable point on a resistor 79 bridging the lines 14, 18. The collector of the transistor 78 is connected through a resistor 81 to the base of a PNP transistor 82 the collector of which is connected to the base of the transistor 51 and the emitter of which is connected to the line 14.

The amplifier is of the push-pull variety and receives an input through the capacitor C5 and a resistor 83 in series to the emitters of a pair of transistors 84 85 having their collectors connected respectively to the lines 14 and 18 and their bases interconnected through a pair of diodes 86, 87 in series. The base of the transistor 84 is connected to the line 14 through a resistor 88 in series with a loudspeaker 89, the junction of the resistor 88 and loudspeaker 89 being connected through a capacitor 90 to the junction of the resistor 83 and the emitters of the transistors 84, 85. The base of the transistor 85 is connected to the collector of a transistor 91 with its emitter connected to the line 18 and its base connected through a diode 92 to the junction of the resistor 83 and capacitor C5.

In operation, the transistors 51 and 65 which form part of the trigger circuit are non-conductive because the base of the transistor 51 is connected through the resistor 57 to the positive terminal of the battery 71. When a dialling operation is commenced by pressing the appropriate button, the switch 22 closes to connect the base of the transistor 51 to the negative terminal of the battery 71 so that the transistor 51 conducts, and turns on the transistor 59 so that power is supplied to the lines 14 and 18. At the same time the transistor 65 is turned on and provides base current to the transistor 51, so that there is no drain of the battery 71, which is charged through the diode 66 by the lines 14, 18. The filter network acts by virtue of the capacitor 56 to vary the change in collector current of the transistor 59, for a given change in the voltage between the lines 14, 15 with frequency. The battery 71 effectively shuts the lines 14, 18 to AC and so the impedance of the filter network is applied across the lines 11, 12, and is arranged to simulate the lifting of the handset. The amplifier is of known form, and its operation need not therefore be described in detail. The amplifier continues to provide an output as long as the trigger circuit is operating. As previously explained, during periods when the lines 11 and 12 are open-circuited or short-circuited, the trigger circuit is held operative by the battery 71.

The circuit continues to operate with the loudspeaker giving the desired audible signal until either the cancel button on the dialling equipment is pressed, or a predetermined time has elapsed, or the handset is lifted from its rest. If the cancel button 23 is closed, the base of the transistor 51 is connected directly to the line 14, so that the transistor 51 turns off, and in turn turns off the transistors 59 and 65. The timing circuit includes the capacitor 74 which is charged exponentially as soon as the voltage appears between the lines 14 and 18. The source of the field effect transistor follows the gate voltage to determine the base voltage of the transistor 78, the emitter voltage of which is determined by the setting on the resistor 79. After the predetermined period of time, transistor 78 turns on to turn on transistor T5 which again couples the base of the transistor 51 directly to the line 14 so that the transistors 51, 65, 59 all turn off.

The sensor 13 is designed to operate whatever the polarity of the lines 11 or 12. When the switch 31 closes, the voltage developed across one of the diodes 32 or 33 will turn on one of the transistors 36 or 37, which will produce an output by way of one of the diodes 94 or 95 which again will couple the base of the transistor 51 to a positive potential so that the transistor 51 turns off.

The purpose of the capacitors 58 and 67 and resistors 57 and 68 in the trigger circuit is to prevent switching on of the transistor 51 by transients. It will of course be appreciated that the diode 66 not only allows the battery 71 to be charged, but prevents it from discharging into the line 18. The diode 64 is incorporated to prevent the transistor 59 from being turned on by the reverse current through the battery, by way of the emitter of transistor 65 and the resistors 63, 52.

The diode 75 in the timing circuit allows the capacitor 74 to discharge to re-set the timing circuit. A capacitor 96 is connected between the lines 14, 18 to act as a low impedance source for the amplifier. The capacitor 46 and resistor 45 across the switch 44 are provided for pulse shaping and transient quenching.

Having thus described our invention what we claim as new and desire to secure by Letters Patent is:

1. Automatic telephone dialling apparatus including a handset, switch means operable manually to dial automatically a pre-selected telephone address, a pair of DC supply lines, a rectifier coupling the DC supply lines to the telephone lines to provide power to said DC supply lines, a trigger circuit connected between the DC supply lines and controlling the supply of power thereto, an amplifier and associated loudspeaker connected between the DC supply lines and coupled to the telephone lines, so that when the trigger circuit is operative the loudspeaker will produce an audible amplified version of the signals on the telephone lines, means operable when the switch means is operated to dial a selected telephone address for driving the trigger circuit to its operative state, and inserting across the telephone lines an impedance which simulates lifting of the handset, the amplifier and loudspeaker than operating so that the dialling tone can be heard without lifting the handset, and means for driving the circuit to its inoperative state when the handset is lifted, the trigger circuit incorporating a battery for maintaining the trigger circuit in its operative state during dialling.

2. Apparatus as claimed in claim 1 including a timing circuit for driving said circuit to its inoperative state after a predetermined period of time.

3. Apparatus as claimed in claim 1 including a manually operable switch for driving said circuit to its inoperative state.

* * * * *